United States Patent [19]
Nomura et al.

[11] Patent Number: 6,055,116
[45] Date of Patent: Apr. 25, 2000

[54] MULTI-STAGE EXTENSION TYPE ZOOM LENS BARREL

[75] Inventors: Hiroshi Nomura, Saitama; Kazuyoshi Azegami, Tokyo; Takamitsu Sasaki, Saitama; Kazunori Ishizuka, Kanagawa, all of Japan

[73] Assignee: Asahi Kogaku Kogyo Kabushiki Kaisha, Tokyo, Japan

[21] Appl. No.: 09/176,963

[22] Filed: Oct. 22, 1998

[30] Foreign Application Priority Data

Oct. 24, 1997 [JP] Japan ..................... 9-292579

[51] Int. Cl.⁷ ........................................... G02B 7/02
[52] U.S. Cl. ................................. 359/822; 819/826
[58] Field of Search .......................... 359/819, 822, 359/826, 425, 503, 506, 508

[56] References Cited

U.S. PATENT DOCUMENTS

| | | | |
|---|---|---|---|
| 3,484,159 | 12/1969 | Roman et al. | 352/140 |
| 5,737,644 | 4/1998 | Nomura et al. | 396/72 |
| 5,742,850 | 4/1998 | Nomura et al. | 396/72 |
| 5,748,388 | 5/1998 | Nomura et al. | 359/700 |
| 5,765,048 | 6/1998 | Nomura et al. | 396/72 |
| 5,884,105 | 3/1999 | Nomura et al. | 396/72 |
| 5,900,992 | 3/1999 | Kodaka et al. | 359/702 |

*Primary Examiner*—Georgia Epps
*Assistant Examiner*—Suzanne Letendre
*Attorney, Agent, or Firm*—Greenblum & Bernstein, P.L.C.

[57] ABSTRACT

A multi-stage extension type zoom lens barrel includes a first rotational feed barrel rotatably connected to a stationary barrel; a first linear movement barrel disposed in, and rotatably connected to, the first rotational feed barrel without relatively moving in the optical axis direction; a second rotational feed barrel disposed in, and rotatably connected to, the first linear movement barrel so as to move in the optical axis direction relative to the first linear movement barrel upon rotating; a rotation transmission barrel which can be detachably inserted between the first rotational feed barrel and the first linear movement barrel from the front thereof; a rotation transmission groove and a projection which connects the rotation transmission barrel and the first rotational feed barrel so as to relatively move in the optical axis direction without relatively rotating; connection members provided at the front ends of the rotation transmission barrel and the second rotational feed barrel; and a connection holding decoration ring detachably attached to the front ends of the second rotational feed barrel and the rotation transmission barrel via a predetermined amount of deformation, so as to hold the connection of the barrels.

12 Claims, 11 Drawing Sheets

MULTI-STAGE EXTENSION TYPE ZOOM LENS BARREL

BACKGROUND OF THE INVENTION

1. Field of the Invention

The present invention relates to a multi-stage extension type zoom lens barrel.

2. Description of the Related Art

In many zoom compact cameras, a multi-stage extension type zoom lens barrel is used to reduce the thickness of the camera when not in use. In such a multi-stage extension zoom lens barrel, the structure is complex and it takes long time to disassemble the zoom lens barrel. Moreover, in general, the disassembling operation requires special disassembling tools which make repairs or replacement of barrel components troublesome. Furthermore, in a rotational feed mechanism for a zoom lens barrel, a cam feed type is known in which the feed (extension or retraction) is carried out in accordance with an engagement between a lead cam (cam groove) and an engagement projection, provided on peripheral surfaces of a pair of opposed lens barrel members; however, the rigidity of the lens barrel tends to decrease due to a small area of engagement between the barrel members.

SUMMARY OF THE INVENTION

It is an object of the present invention to provide a multi-stage extension type zoom lens barrel which can be easily assembled.

Another object of the present invention is to provide a multi-stage extension type zoom lens barrel which exhibits high rigidity when assembled.

According to an aspect of the present invention, there is provided a multi-stage extension type zoom lens barrel, including: a first rotational feed barrel which is rotatably connected to a stationary barrel integral with a camera body, so that when the rotation of the first rotational feed barrel occurs, the first rotational feed barrel is moved in an optical axis direction; a first linear movement barrel which is guided in the first rotational feed barrel to linearly move in the optical axis direction, the first linear movement barrel being connected to the first rotational feed barrel so as to relatively rotate without relatively moving in the optical axis direction; a second rotational feed barrel which is disposed in, and rotatably connected to, the first linear movement barrel, so that when the second rotational feed barrel is rotated, the second rotational feed barrel is moved in the optical axis direction relative to the first linear movement barrel; a rotation transmission barrel which is removably inserted between the first rotational feed barrel and the first linear movement barrel from the front thereof; a rotation transmission groove and a projection which are provided on one and the other of the rotation transmission barrel and the first rotational feed barrel, the rotation transmission groove extending in a direction parallel with the optical axis; wherein the rotation transmission projection is engaged in the rotation transmission groove to connect the rotation transmission barrel and the first rotational feed barrel so as to relatively move in the optical axis direction without relatively rotating; a connection mechanism provided at the front ends of the rotation transmission barrel and the second rotational feed barrel, for connecting the rotation transmission barrel and the second rotational feed barrel when the rotation transmission barrel is inserted during assembly; and a connection holding decoration ring which is detachably attached to the front ends of the second rotational feed barrel and the rotation transmission barrel due to a predetermined amount of deformation of the decoration ring, so that when the decoration ring is attached, the decoration ring secures the connection between the second rotational feed barrel and the rotation transmission barrel.

With this arrangement, when the rotation transmission barrel is attached, the feed force transmission mechanism is completed. The rotation transmission barrel can be inserted in the lens barrel in the optical axis direction. When the rotation transmission barrel is attached, the front end thereof is connected to the second rotational feed barrel. The rotation transmission barrel is located outside the second rotational feed barrel but constitutes the same feed-stage unit as the second rotational feed barrel. Namely, the rotation transmission barrel which transmits the feed force from the first feed-stage unit to the second feed-stage unit can be easily detached in the assembled state of the lens barrel. Thus, the zoom lens can be easily disassembled only by detaching the connection holding decoration ring.

Preferably, the connection mechanism includes a plurality of radially projecting engagement projections and a plurality of engagement recesses in which the engagement projections are fitted in the engagement recesses in the axial direction, the engagement projections and the engagement recesses being provided on one and the other of the second rotational feed barrel and the rotation transmission barrel, respectively.

Preferably, another deformable decoration ring separate from the connection holding decoration ring is provided which is detachably attached to the front end of the first rotational feed barrel due to a predetermined amount of deformation of the second decoration ring, so that when the second decoration ring is attached, the rotation transmission barrel can be prevented from slipping off from the first rotational feed barrel in the optical axis direction.

Preferably, the decoration rings cannot be detached externally when the zoom lens barrel is retracted inside the camera body.

In an embodiment, the first rotational feed barrel is connected to the stationary barrel via helicoids; the first linear movement barrel is provided on its inner peripheral surface with a female helicoid; the second rotational feed barrel is in the form of a double helicoid barrel which is provided with a male helicoid which engages with the female helicoid of the first linear movement barrel on the outer peripheral surface thereof, and provided with a female helicoid on the inner peripheral surface thereof; and wherein the zoom lens barrel comprises: a second linear movement barrel which is provided with a male helicoid which engages with the female helicoid of the second rotational feed barrel and which is guided to linearly move in the optical axis direction; a first lens group which is supported by the second linear movement barrel; and at least one lens group which is guided relative to the second linear movement barrel to linearly move independently of the first lens group. In this structure, a three-stage extension zoom lens barrel in which the extension members are all connected by the helicoids can be provided.

According to another aspect of the present invention, there is provided a multi-stage extension type zoom lens barrel including: a stationary barrel which is integral with a camera body; a first feed-stage unit which includes a first rotational feed barrel which is rotatably connected to the stationary barrel and is moved in an optical axis direction upon rotation thereof, and a first linear movement barrel which is guided in the first rotational feed barrel to linearly move in the optical axis direction and is connected to the first rotational feed barrel so as to relatively rotate without relatively moving in the optical axis direction; a second feed-stage unit which includes a second rotational feed barrel which is disposed in, and rotatably connected to, the first linear movement barrel, wherein the second rotational feed barrel is moved in the optical axis direction relative to the first linear movement barrel when the second rotational feed barrel is rotated; and a rotational transmission barrel which is removably inserted between the first rotational feed barrel and the first linear movement barrel from the front thereof, the rotational transmission barrel being engaged with the first rotational feed barrel so as to relatively move in the direction of the optical axis and to rotate together therewith, and wherein the rotation transmission barrel is integrally connected to the second rotational feed barrel.

Preferably, the assembly of the zoom lens barrel includes: attaching the first and second feed-stage units to the stationary barrel from the front thereof; and inserting the rotation transmission barrel between the first rotational feed barrel and the first linear movement barrel from the front thereof, in that order; wherein the rotation of the first rotational feed barrel of the first feed-stage unit can be transmitted to the second rotational feed barrel of the second feed-stage unit.

Preferably, the multi-stage extension type zoom lens barrel further includes: a first decoration ring which is detachably attached to the front ends of the second rotational feed barrel and the rotation transmission barrel via a predetermined amount of deformation of the first decoration ring; a second decoration ring which is detachably attached to the front end of the first rotational feed barrel via a predetermined amount of deformation of the second decoration ring.

Preferably, upon assembly of the rotation transmission barrel being completed, the first decoration ring is attached to the front ends of the second rotational feed barrel and the rotation transmission barrel so as to secure the connection therebetween; and the second decoration ring is attached to the front end of the first rotational feed barrel so as to prevent the rotation transmission barrel from slipping off the first rotational feed barrel in the optical axis direction.

Preferably, the disassembly of the zoom lens barrel includes: removing the rotation transmission barrel, between the first rotational feed barrel and the first linear movement barrel, in a forward direction away from the stationary barrel; wherein the rotation transmission from the first rotational feed barrel of the first feed-stage unit to the second rotational feed barrel of the second feed-stage unit is disengaged; and the first and second feed-stage units are disengaged and removed in the forward direction, away from the stationary barrel.

Preferably, the multi-stage extension type zoom lens barrel further includes: a first decoration ring which is detachably attached to the front ends of the second rotational feed barrel and the rotation transmission barrel via a predetermined amount of deformation of the first decoration ring; a second decoration ring which is detachably attached to the front end of the first rotational feed barrel via a predetermined amount of deformation of the second decoration ring.

Preferably, before the disassembly of the rotation transmission barrel is carried out, the first decoration ring is detached from the front ends of the second rotational feed barrel and the rotation transmission barrel; wherein the rotation transmission barrel can be removed in the forward direction away from the second rotational feed barrel; and the second decoration ring is detached from the front end of the first rotational feed barrel wherein the rotation transmission barrel can be removed in the forward direction away from the first rotational feed barrel.

The present disclosure relates to subject matter contained in Japanese Patent Application No.9-292579 (filed on Oct. 24, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

A zoom lens barrel 10 can be attached to a camera body 9 of a zoom compact camera 5 and is composed of a first lens group L1, a second lens group L2, and a third lens group L3. The zooming operation is carried out by varying the distance between the three lens groups and the distance between a film surface and each lens group. The focusing operation is carried out by moving the second lens group L2 in a direction parallel with the optical axis O. The whole structure and operation of the zoom lens barrel 10 will be discussed below with reference to FIGS. 1 through 4.

An aperture plate 11 is secured to the camera body 9 so that the edge of the aperture plate 11 defines an aperture 11a which determines the exposure area for a film. A stationary barrel 13 is secured to the camera body 9 in front of the aperture plate 11. The stationary barrel 13 is provided on the inner peripheral surface with a female helicoid (internal helicoid) 14 and three linear movement guide grooves 15 which extend in parallel with the optical axis O and which are circumferentially spaced from one another.

The stationary barrel 13 is provided with a recess 13a (FIG. 4) which extends in parallel with the optical axis O, so that a zoom gear 16 is attached adjacent the recess 13a. The zoom gear 16 is supported so as to rotate about an axis substantially parallel with the optical axis O and has pinions whose teeth project into the inside of the stationary barrel 13 through the recess 13a. A zoom motor M is provided in the camera body 9, so that the rotation of the drive shaft of the zoom motor M is transmitted to the zoom gear 16 through a zoom gear train 8.

The female helicoid 14 of the stationary barrel 13 is engaged by a male helicoid (external helicoid) 18 formed on the outer peripheral surface of a first outer barrel (first rotational feed barrel) 17 at the rear end thereof. The width of the male helicoid 18 in the direction of the optical axis is such that the male helicoid 18 is not exposed to the outside when the first outer barrel 17 is extended to the most advanced position. The first outer barrel 17 is provided, on the outer peripheral surface thereof on which the male helicoid 18 is formed, with a plurality of outer peripheral gear segments 19 that extend in parallel with the male helicoid 18. The teeth of each outer peripheral gear segments 19 extend in parallel with the optical axis O and are engaged by the zoom gear 16. The first outer barrel 17 is provided on the inner peripheral surface thereof with three rotation transmission grooves 17a which extend from the front end to the rear end of the first outer barrel 17 in the direction parallel with the optical axis O.

A first linear movement guide ring (first linear movement barrel) 20 is provided in the first outer barrel 17. The first linear movement guide ring 20 is provided, on the outer peripheral surface at the rear end thereof, with a pair of circumferentially parallel flanges 21a and 21b that extend in a radial direction. The flanges 21a and 21b define therebetween an annular groove 21c whose center is located on the optical axis O. The first outer barrel 17 is provided, on the inner peripheral surface at the rear end thereof, with a plurality of engagement projections 23 (only one of which is shown in the drawings, see FIGS. 1 through 3) that are spaced from one another in a circumferential direction and that project in the radial and inward direction (toward the optical axis O). The thickness of each projection 23 is such that the projections are snugly fitted in the annular groove 21c formed in the first linear movement guide ring 20 in the direction parallel with the optical axis O so as to slide therein in the circumferential direction. The front flange 21a has a plurality of cutaway portions 21d that allow the engagement projections 23 to insert into, or to remove from, the annular groove 21c in the axial direction. Consequently, when the engagement projections 23 of the first outer barrel 17 are inserted in the annular groove 21c through the cutaway portions 21d, and thereafter the first outer barrel 17 is rotated whereby the engagement projections 23 are moved in the annular groove 21c in the circumferential direction, the first outer barrel 17 and the first linear movement guide ring 20 are interconnected so as not to move relative to each other in the axial direction but to rotate relative to each other. Namely, the coupling composing the engagement projections 23, the annular groove 21c and the cutaway portions 21d; is in the form of a bayonet coupling mechanism, and can be disconnected from or connected to one another at a predetermined relative angular position.

The first linear movement guide ring 20 is provided on the outer peripheral surface at the rear end thereof with three radially projecting linear movement guide projections 24 that are spaced from one another at a predetermined distance in the circumferential direction. The linear movement guide projections 24 are slidably engaged in the linear movement guide grooves 15 formed on the inner peripheral surface of the stationary barrel 13. Consequently, the first linear movement guide ring 20 is moved together with the first outer barrel 17 in the axial direction without rotating relative to the stationary barrel 13 in the circumferential direction about the optical axis O. Thus, the linear movement of the first linear movement guide ring 20 is guided.

The first outer barrel 17 and the first linear movement guide ring 20 constitute a first feed-stage unit (extension barrel) of the zoom lens barrel 10. In the first feed-stage unit, when the zoom gear 16 is rotated in a predetermined direction by the zoom motor M, the first outer barrel 17 is rotated through the outer peripheral gear segments 19, so that the first outer barrel 17 is advanced from the stationary barrel 13 while rotating in accordance with the relationship between the female helicoid 14 and the male helicoid 18. At the same time, the first linear movement guide ring 20 which is supported to rotate relative to the first outer barrel 17 is moved together with the first outer barrel 17 relative to the stationary barrel 13 in the axial direction parallel with the optical axis O while being linearly guided.

The first linear movement guide ring 20 is provided on its inner peripheral surface with a female helicoid 27 whose direction is the same as the female helicoid 14. The first linear movement guide ring 20 is also provided on its inner peripheral surface with three linear movement guide grooves 28 that extend in parallel with the optical axis O and that are spaced from one another at a predetermined angular distance in the circumferential direction.

A drive cam ring 30 (second rotational feed barrel) is provided in the first linear movement guide ring 20. The drive cam ring 30 is provided on the outer peripheral surface thereof with a male helicoid 29 which engages with the female helicoid 27. The male helicoid 29 is formed on the entire peripheral surface of the drive cam ring 30. Also, the drive cam ring 30 is provided on its entire inner peripheral surface with a female helicoid 31 whose inclination direction is opposite to that of the male helicoid 29.

The drive cam ring 30 is equipped on the inner peripheral surface at the rear end thereof with a plurality of engagement projections 32 (only one of which is shown in the drawings [shown in FIGS. 1 through 3]) which are located in different circumferential positions and which extend in a radial and inward direction (toward the optical axis O).

A second linear movement guide ring 33 is provided in the drive cam ring 30. The second linear movement guide ring 33 is provided, on the outer peripheral surface at the rear end thereof, with a pair of circumferentially parallel flanges 34a and 34b that extend in the radial and outward direction. The flanges 34a and 34b define therebetween an annular groove 34c whose center is located on the optical axis O. The front flange 34a has a plurality of cutaway portions 34d that allow the engagement projections 32 to insert into, or to remove from, the annular groove 34c in the axial direction. When the engagement projections 32 of the drive cam ring 30 are inserted in the annular groove 34c through the cutaway portions 34d and thereafter the drive cam ring is rotated whereby the engagement projections 32 are moved in the annular groove 34c in the circumferential direction, the drive cam ring 30 and the second linear movement guide ring 33 are interconnected so as not to move relative to each other in the axial direction but to rotate relative to each other. Namely, the coupling composing the engagement projections 32, the annular groove 34c and the cutaway portions 34d; is in the form of a bayonet coupling mechanism, and can be disconnected from or connected to one another at a predetermined relative angular position.

Figure 4:
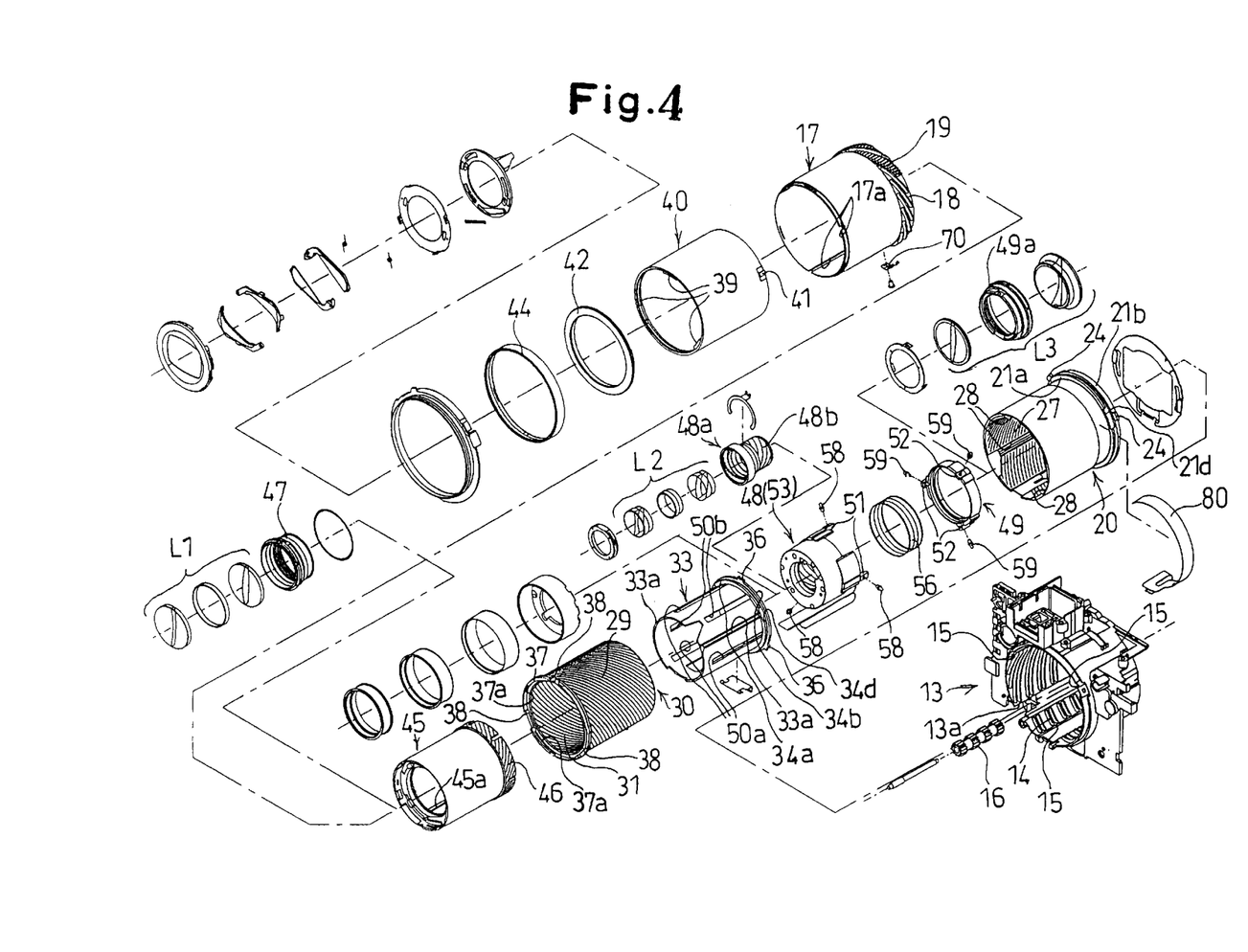
FIG. 4 is an exploded perspective view of a zoom lens barrel.

The second linear movement guide ring 33 is provided at the rear end thereof with three linear movement guide projections 36 (only two of them are shown in FIG. 4) at different circumferential positions, that project outward in the radial direction. The linear movement guide projections 36 are slidably engaged in respective linear movement guide grooves 28 formed on the inner peripheral surface of the first linear movement guide ring 20. Consequently, the second linear movement guide ring 33 is linearly guided in the first linear movement guide ring 20 so as to move relative to the stationary barrel 13 through the first linear movement guide ring 20.

A second outer barrel (rotation transmission barrel) 40 is located between the first outer barrel 17 and the first linear movement guide ring 20. Three rotation transmission projections 41 (only one of which is shown in FIG. 4) provided on the outer peripheral surface of the second outer barrel 40 at the rear end thereof in different circumferential positions are slidably fitted in the three rotation transmission grooves 17a formed on the inner peripheral surface of the first outer barrel 17 and extending in parallel with the optical axis O. Thus, the second outer barrel 40 is guided so as not to relatively rotate but so as to move relative to the first outer barrel 17 along the optical axis O.

The drive cam ring 30 is provided on the front end thereof with a rib 37 having a certain thickness in the radial direction of the drive cam ring 30. The rib 37 is equipped with three cutaway portions 38. The second outer barrel 40 is equipped, on the inner peripheral surface at the front end thereof, with three engaging projections 39 that can be engaged in the cutaway portions 38 of the rib 37 and that project in the radial and inward direction. The prevention of accidental disengagement or detachment of the projections 39 from the cut-away portions 38 will hereafter be described.

Figure 11:
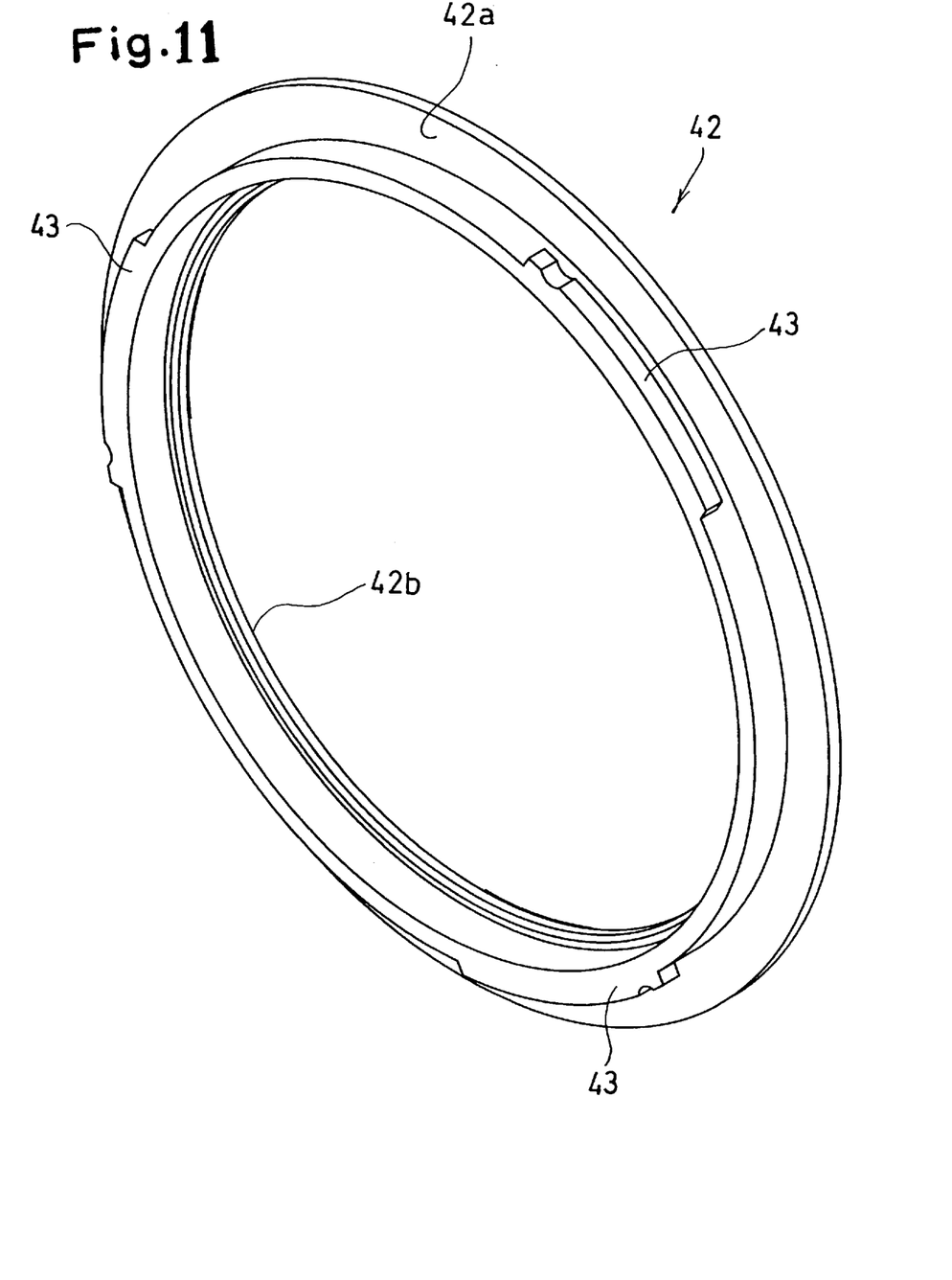
FIG. 11 is a rear perspective view of an accidental detachment prevention decoration ring.
Figure 12:
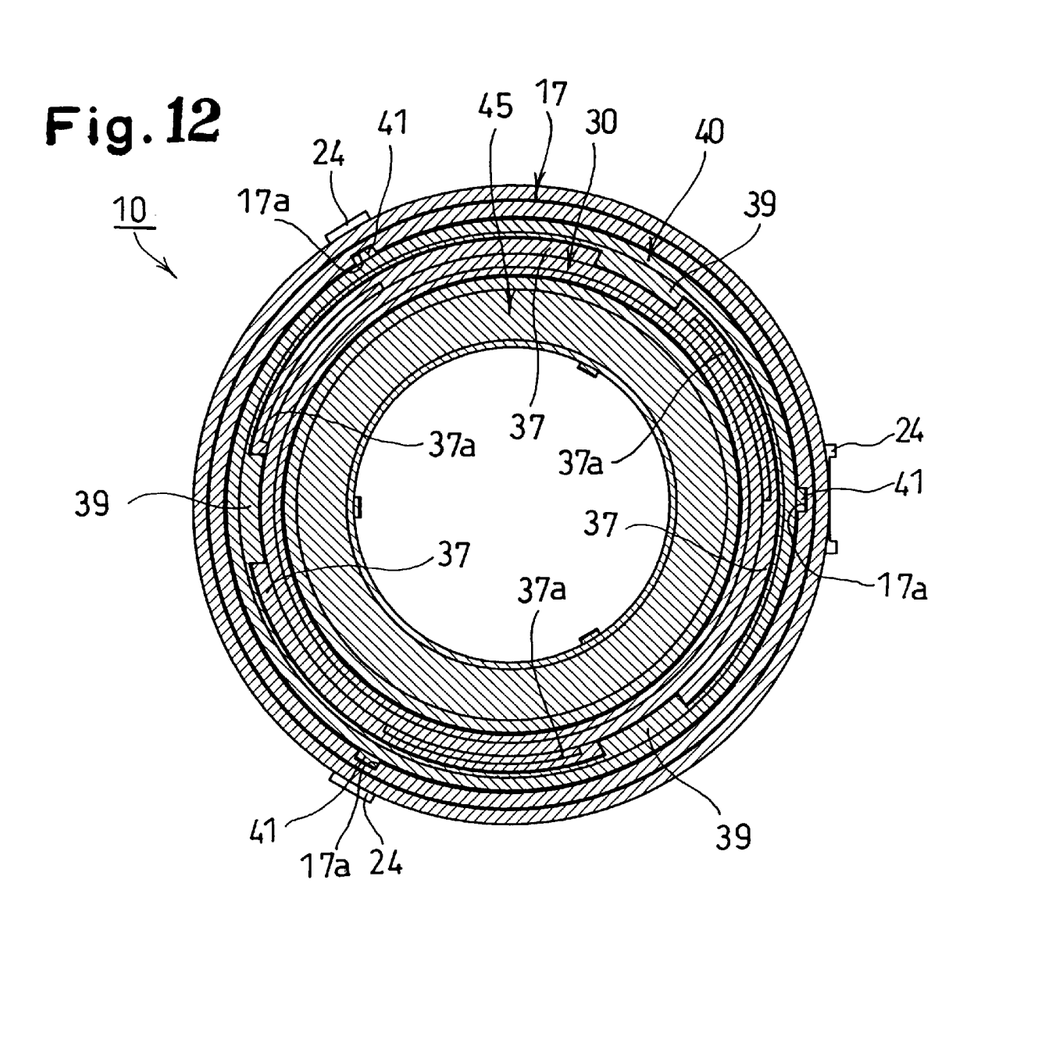
FIG. 12 is a front elevational view of a zoom lens barrel when the decoration ring is removed.

Each rib 37 is provided on its inner peripheral surface with accidental detachment prevention recesses (slip-off prevention recesses) 37a. A decoration ring (connection holding decoration ring, first decoration ring) 42 shown in FIG. 11 is provided with three engagement projections 43 corresponding to the accidental detachment prevention recesses 37a. When the engagement projections 43 are fitted in the slip-off prevention recesses 37a, the decoration ring 42 is firmly connected to the drive cam ring 30. The decoration ring 42 thus connected closes (at its rear end face 42a) the front open ends of the recesses 38, so that no slip-off of the engagement projections 39 occurs. Namely, the drive cam ring 30 and the second outer barrel 40 are interconnected so as not to relatively move in the optical axis direction or so as not to relatively rotate.

Consequently, when the second outer barrel 40 is rotated in association with the rotation of the first outer barrel 17, the rotation of the drive cam ring 30 takes place. As a result, the drive cam ring 30 integral with the second outer barrel 40 is advanced from the first linear movement guide ring 20, which constitutes the first feed-stage, in accordance with the relationship between the female helicoid 27 and the male helicoid 29.

The drive cam ring 30 and the second linear movement guide ring 33 constitute a second feed-stage unit (extension barrel) of the zoom lens barrel 10. When the first outer barrel 17 which constitutes the first feed-stage unit is rotated and extended from the stationary barrel 13, the second outer barrel 40 is rotated in association with the first outer barrel 17 due to the engagement between the rotation transmission grooves 17a and the rotation transmission projections 41. The drive cam ring 30, to which the rotation of the second outer barrel 40 is transmitted, is advanced from the first linear movement guide ring 20 together with the second outer barrel 40, while rotating relative to the stationary barrel 13 in the same direction as the first outer barrel 17, in accordance with the engagement between the female helicoid 27 and the male helicoid 29. At the same time, the second linear movement guide ring 33 which is connected to the drive cam ring 30 so as to rotate relative thereto is moved in the direction of the optical axis together with the drive cam ring 30 while being guided by the first linear movement guide ring 20 in accordance with the engagement between the linear movement guide projections 36 and the linear movement guide grooves 28.

A third outer barrel (second linear movement barrel) 45 is provided in the drive cam ring 30. The second linear movement guide ring 33 is located in the third outer barrel 45. The second linear movement guide ring 33 is provided on the outer peripheral surface thereof with a plurality of linear movement guide grooves 33a extending in parallel with the optical axis O. The third outer barrel 45 is provided on its inner peripheral surface with a plurality of linear movement guide projections 45a (only one of which is shown in FIG. 4) which can be engaged by the linear movement guide grooves 33a. The linear movement guide projections 45a provided on the third outer barrel 45 are slidably engaged by the linear movement guide grooves 33a provided on the second linear movement guide ring 33, so that the third outer barrel 45 can be moved in the direction parallel with the optical axis O relative to the second linear movement guide ring 33 through the engagement of the linear movement guide grooves 33a and the linear movement guide projections 45a.

The third outer barrel 45 is provided on the outer peripheral surface at the rear end thereof with a male helicoid 46 which engages with the female helicoid 31 formed on the inner peripheral surface of the drive cam ring 30. When the drive cam ring 30 is rotated, the rotational force is applied to the third outer barrel 45, but the third outer barrel 45 which is linearly guided by the second linear movement guide ring 33 does not rotate together with the drive cam 30. Consequently, the third outer barrel 45 is advanced relative to the drive cam ring 30 while moving in the direction parallel with the optical axis O relative to the stationary barrel 13, in accordance with the male helicoid 46 and the female helicoid 31. Namely, the third outer barrel 45 constitutes a third feed-stage unit (extension barrel) of the lens barrel. The length of the male helicoid 46 in the direction of the optical axis is such that the male helicoid 46 is not exposed to the outside when the third outer barrel 45 is extended to the maximum extension position.

A first lens frame 47 which holds the first lens group L1 is secured to the third outer barrel 45.

The second linear movement guide ring 33 is provided on the peripheral surface thereof with three axially extending second lens guide through slits 50a which are adapted to guide the second lens group L2 and three axially extending third lens guide through slits 50b which are adapted to guide the third lens group L3. The second lens guide through slits 50a and the third lens guide through slits 50b are alternately arranged in the circumferential direction.

The second lens group L2 is held by a second lens support frame 48a which constitutes a second lens unit 48, and the third lens group L3 is held by a third lens support frame 49a which is supported in the third lens support ring 49. The shutter block 53 of the second lens unit 48 is provided on the outer peripheral surface with three sliding plates 51. The sliding plates 51 are slidably fitted in the second lens guide through slits 50a. Likewise, the third lens support ring 49 is provided on the outer peripheral surface with three sliding plates 52. The sliding plates 52 are slidably fitted in the third lens guide through slits 50b. Thus, the second lens unit 48 (second lens support frame 48a) and the third lens support ring 49 (third lens support frame 49a) can be independently slid within the second linear movement guide ring 33 in the direction parallel with the optical axis O. Note that a compression spring 56 is provided between the second lens unit 48 and the third lens support ring 49 to remove backlash, so that the second lens unit 48 and the third lens support ring 49 are biased forward and rearward, respectively.

The second lens unit 48 supported in the drive cam ring 30 and the third lens support ring 49 are moved in the axial direction in accordance with the feed operation of the zoom lens barrel 10. Namely, the sliding plates 51 of the second lens unit 48 and the sliding plates 52 of the third lens support ring 49 are provided with radially projecting guide pins 58 and 59. The drive cam ring 30 is provided on the inner peripheral surface thereof with predetermined profiles of cam grooves 30a and 30b corresponding to the guide pins 58 and 59. The guide pins 58 and 59 are slidably fitted in the cam grooves 30a and 30b, respectively. The guide grooves 30a which guide the guide pins 58 and the cam grooves 30b which guide the guide pins 59 have a non-linear oblique profile. Consequently, when a relative rotation between the drive cam ring 30 and the second linear movement guide ring 33 occurs, the second lens group L2 (second lens unit 48) and the third lens group L3 (third lens support ring 49) are relatively moved in the direction parallel with the optical axis O, respectively, through the guide pins 58 and 59.

The shutter block 53 of the second lens unit 48 is provided on the shaft portion thereof with a threaded hole (internal thread) 53a in which an external thread 48b of the second lens frame 48a is screw-engaged. The shutter block 53 contains therein a focusing motor which, upon focusing, drives the second lens frame 48a due to the engagement between the internal thread 53a and the external thread 48b in accordance with an object distance signal supplied from a focusing device and a focal length signal produced by the zooming operation to thereby move the second lens group L2 in the direction of the optical axis. The shutter block 53 is provided with shutter blades 55 which function also as a diaphragm and which are opened and closed in accordance with an object brightness signal. The shutter block 53 receives drive signals which are used for driving the shutter and the focusing operation, through an FPC (Flexible Printed Circuit) board 60.

The zoom lens barrel 10 is provided with a focal length detection mechanism (encoder) in the first feed-stage unit. The focal length detection mechanism is comprised of a code plate 80 which is adhered to the outer peripheral surface of the first linear movement guide ring 20 and which is elongated in the circumferential direction thereof, and a brush 70 which is in contact with the code plate 80. Upon zooming, when the first outer barrel 17 and the first linear movement guide ring 20 are relatively rotated, the brush 70 is in sliding contact with the code plate 80 to detect a finite number of stages of the focal length.

The FPC board 60 is composed of a shutter substrate 60a connected to the shutter block 53 and a code plate substrate 60b connected to the code plate 80 which is adhered to the outer peripheral surface of the first linear movement guide ring 20. The substrates 60a and 60b have a length long enough to permit the extension and retraction of the zoom lens barrel 10. The FPC board 60 is connected at the other end to a CPU 100 in the camera body.

The zoom lens barrel 10 operates as follows. If the zoom motor M is driven in the extension direction of the zoom lens barrel in the retracted position shown in FIG. 1 or in the wide-angle extremity shown in FIG. 2, the first outer barrel 17 is rotated and advanced from the stationary barrel 13. Consequently, the first linear movement guide ring 20 is moved forward together with the first outer barrel 17 while being linearly guided by the stationary barrel 13. As a result, the drive cam ring 30 is advanced together with the second outer barrel 40 from the first linear movement guide ring 20 while rotating in the same direction as the first outer barrel 17. At the same time, the linear movement of the second linear movement guide ring 33 in the axial direction, together with the drive cam ring 30 occurs. When the rotation of the drive cam ring 30 takes place, the second lens group L2 and the third lens group L3 are moved forward in the direction of the optical axis while varying the distance between the second and third lens groups L2 and L3 within the second feed-stage unit, in accordance with the engagement between the guide pins 58 and 59 and the corresponding cam grooves 30a and 30b. Moreover, the third outer barrel 45 which is linearly guided by the second linear movement guide ring 33 is moved forward in the direction of the optical axis in accordance with the rotation of the drive cam ring 30, so that the first lens group L1 is moved forward relative to the second and third lens groups L2 and L3. If the zoom motor M is driven in the retraction direction of the lens barrel at the telephoto extremity shown in FIG. 3, the zoom lens barrel 10 operates in the opposite way to the above-mentioned operation.

As can be seen from the foregoing, in the three-stage feed type zoom lens barrel 10, the zooming operation is carried out by varying the distance of the first, second and third lens groups L1, L2 and L3 from the film surface and by varying the distance between the lens groups in combination, and the focusing operation is carried out by moving the second lens group L2 in the direction of the optical axis, respectively.

The zoom lens barrel 10 is assembled as follows, with reference to FIGS. 5 through 10.

The second lens unit 48 is constructed by firstly screw engaging the external thread 48b of the second lens support frame 48a with the internal thread 53a of shutter block 53, thereby supporting the second lens support frame 48a therein so as to be movable in the direction of the optical axis within the shutter block 53. Subsequently, the third lens support frame 49a is attached to the third lens support ring 49. Upon the assembly of the above, the second lens unit 48 and the third lens support ring 49 are attached to the drive cam ring 30 and the second linear movement guide ring 33 so as to move relative to each other in the axial direction via above-mentioned lens guide mechanism which includes the cam grooves 30a and 30b, the lens guide through slits 50a and 50b, guide pins 58 and 59, and sliding plates 51 and 52. Note that the drive cam ring 30 and the second linear movement guide ring 33 have been previously interconnected via above-mentioned bayonet-type coupling so as not to move relative to each other in the axial direction but to rotate relative to each other.

Thereafter, the third outer barrel 45 which supports the first lens group L1 is attached between the drive cam ring 30 and the second linear movement guide ring 33 so as to move relative to the rings 30 and 33 in the axial direction via the above-mentioned linear movement guide mechanism (the guide grooves 33a and the guide projections 45a) and helicoids (the male helicoid 46 and the female helicoid 31).

Moreover, the drive cam ring 30 which supports the first, second, and third lens group; is attached in the first linear movement guide ring 20 via the screw-engagement of male helicoid 29 and female helicoid 27.

Figure 5:
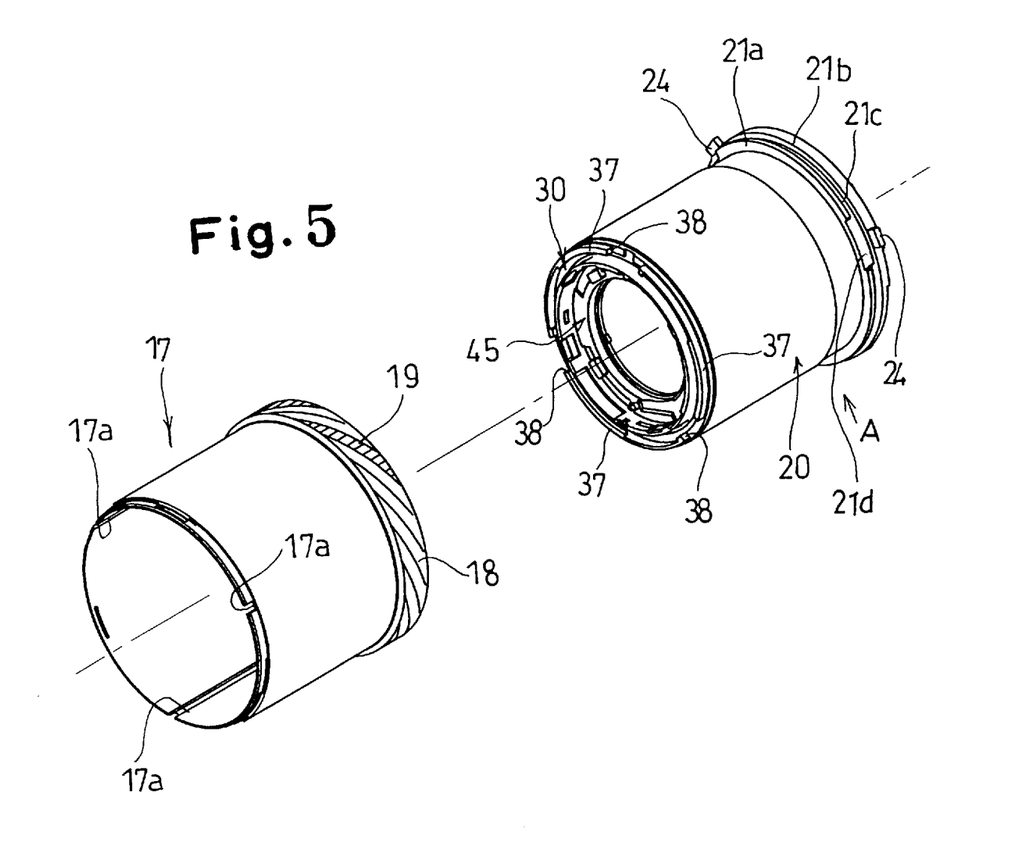
FIGS. 5 through 9 are perspective views of a zoom lens barrel to show the assembling operation.
Figure 6:
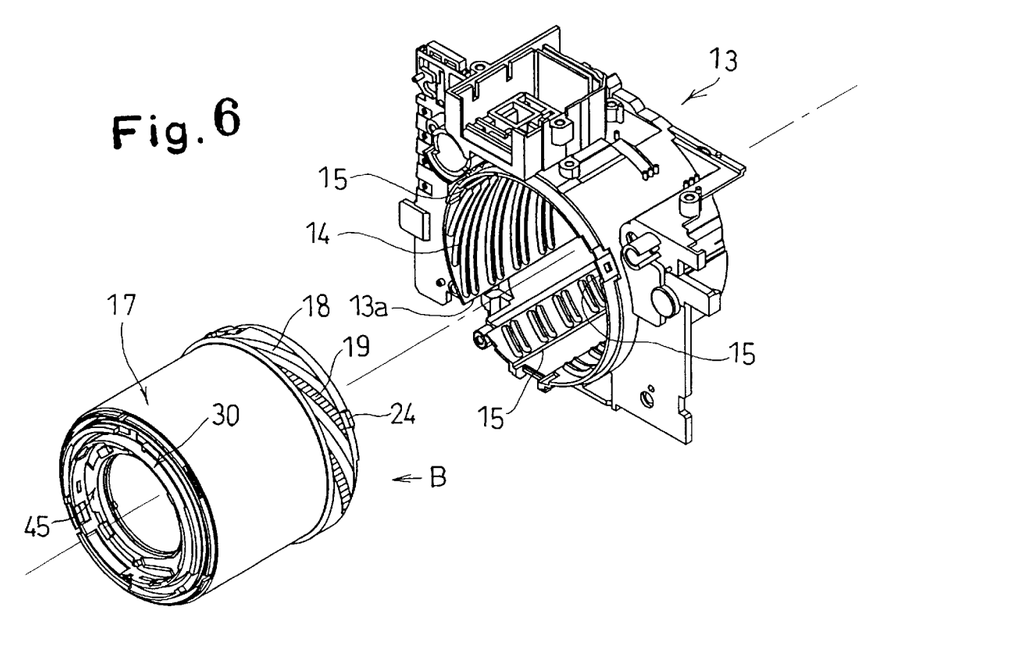

Unit "A" shown in FIG. 5 is constructed via the above-described procedure. When the first outer barrel 17 is engaged with the first linear movement guide ring 20 of unit "A" so as to relatively rotate via the engagement projections 23 and the annular groove 21c (bayonet-type coupling), a unit "B" shown in FIG. 6 is obtained. In unit "B", the brush 70 is in contact with the code plate 80. Thereafter, the male helicoid 18 of the first outer barrel 17 is engaged with the female helicoid 14, and the linear movement guide projection 24 of the linear movement guide ring 20 is engaged in the linear movement guide groove 15, so that unit "B" is attached to the stationary barrel 13 from the front (FIGS. 6, 7).

In unit "B", since no second outer barrel 40 is attached, the rotation is not transmitted from the first feed-stage unit (first outer barrel 17) to the second feed-stage unit (drive cam ring 30). Namely, the drive cam ring 30 is connected to the first linear movement guide ring 20 which is guided by the stationary barrel 13 to move linearly, through the helicoids, but the rotation of the first outer barrel 17 which is rotated and extended from the stationary barrel 13 is not transmitted. Consequently, if the first outer barrel 17 is rotated to extend the first feed-stage unit from the stationary barrel 13, the drive cam ring 30 is moved in the optical axis direction together with the first linear movement guide ring 20 but no extension of the second feed-stage unit from the first feed-stage unit takes place. Moreover, due to no transmission of the rotation of the first outer barrel 17 to the drive cam ring 30, the third outer barrel 45 is not advanced from the drive cam ring 30.

Figure 7:
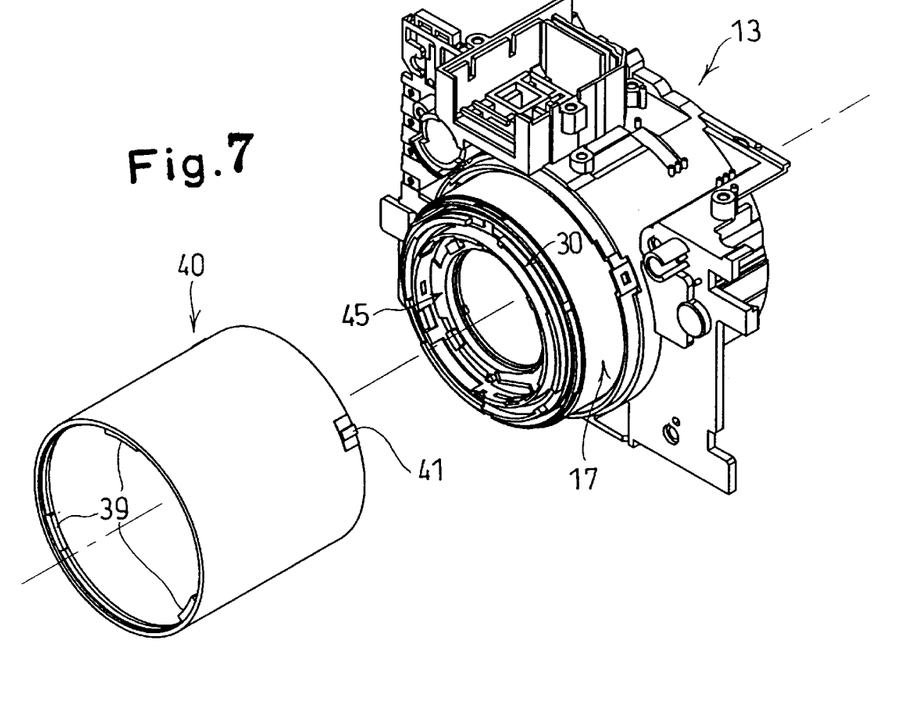
Figure 8:
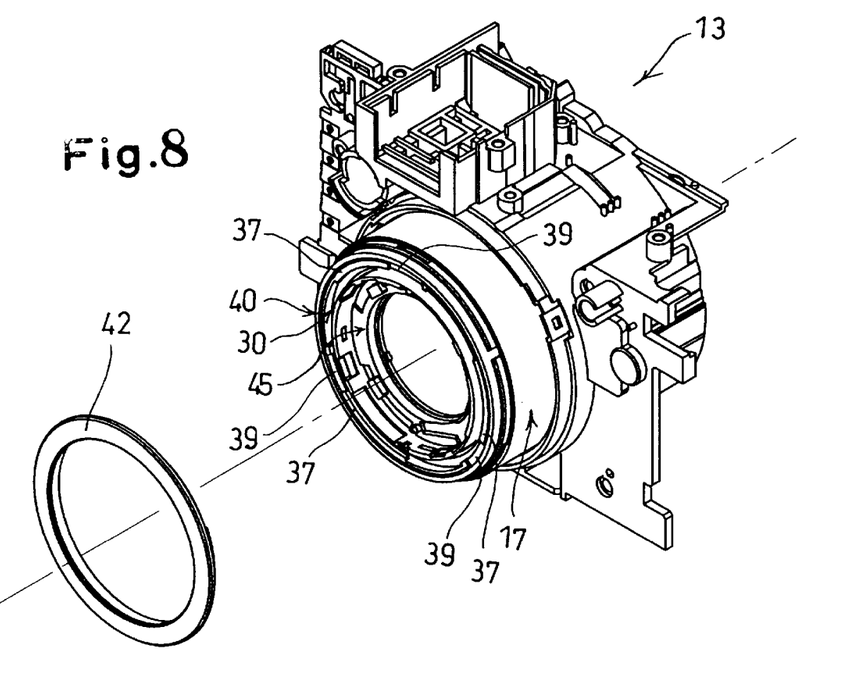

Thereafter, the second outer barrel 40 is inserted between the first outer barrel 17 and the first linear movement guide ring 20 of unit "B" from the front (FIG. 7). The radial clearance between the first outer barrel 17 and the first linear movement guide ring 20 corresponds to the thickness of the second outer barrel 40. Therefore, the second outer barrel 40 can be inserted from the front between the first outer barrel 17 and the first linear movement guide ring 20, with the three rotation transmission projections 41 fitted in the three rotation transmission grooves 17a. When the second outer barrel 40 is inserted to the innermost position, the three engagement projections 39 which project in the radial and inward direction from the inner peripheral surface at the front end of the second outer barrel 40 are fitted in the three recesses 38 formed in the rib 37 of the drive cam ring 30, so that the drive cam ring 30 can be integrally connected to the second outer barrel 40 (FIG. 8).

Figure 9:
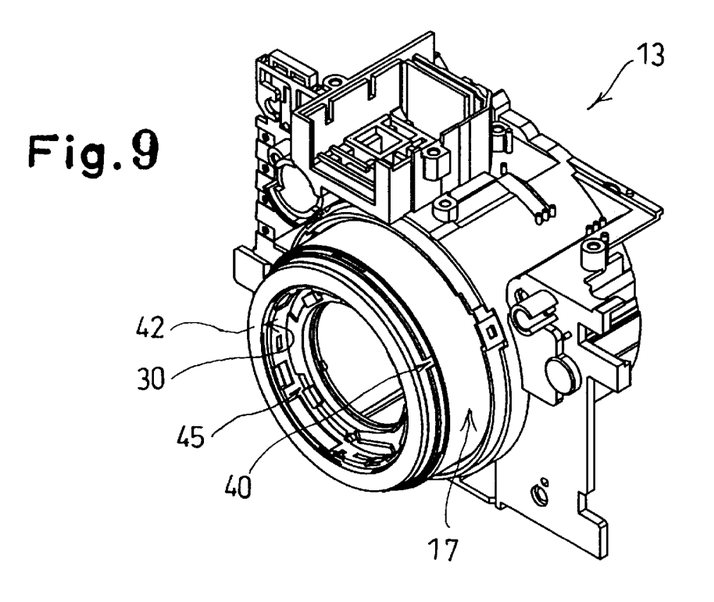

The engagement projections 43 of the decoration ring 42 are fitted in the slip-off prevention recesses 37a to attach the decoration ring 42 to the rib 37 of the drive cam ring 30. Consequently, the engagement projections 39 can be prevented from being disengaged from the recesses 38 by the decoration ring 42 (FIG. 9). The decoration ring 42 can be detached from the rib 37 by deforming the decoration ring when a predetermined amount of deformation of the decoration ring 42 occurs. However, the decoration ring 42 is not accidentally disengaged from the rib during the normal feed operation, unless a user intentionally exerts an external disengagement force on the decoration ring 42. Namely, the drive cam ring 30 and the second outer barrel 40 are integrally connected by the decoration ring 42 so as not to relatively move in the optical axis direction or rotate relative to each other.

In this state, the rotation of the first outer barrel 17 is transmitted to the drive cam ring 30 through the second outer barrel 40. Therefore, when the first feed-stage unit is advanced, the second feed-stage unit and the third feed-stage unit can be extended or retracted.

The second outer barrel 40 is inserted between the first outer barrel 17 and the first linear movement guide ring 20 with substantially no clearance; furthermore, the decoration ring 42 is attached thereto, and hence, no light can enter the lens barrel from the front. The inner diameter of the opening of the decoration ring 42 is larger than the outer diameter of the cylindrical portion of the third outer barrel 45, except for the male helicoid 46, and is smaller than the outer diameter of the male helicoid 46. Therefore, when the decoration ring 42 is attached, the inner edge 42b of the opening thereof restricts the forward movement of the third outer barrel 45 beyond the most advanced position relative to the drive cam ring 30 and thus, no detachment of the third outer barrel 45 occurs.

Finally, a decoration ring (second decoration ring) 44 shown in FIG. 4 is attached to the front end of the first outer barrel 17. The decoration ring 44 closes the front end of the rotation transmission grooves 17a to prevent the rotation transmission projections from coming out thereof so that the second outer barrel 40 is prevented from being disengaged when it is moved in the forward direction relative to the first outer barrel 17. The decoration ring 44 prevents light from entering between the front end of the first outer barrel 17 and the second outer barrel 40. The decoration ring 44 can be detached by deforming the same by a predetermined amount.

The above-mentioned assembly of the zoom lens barrel 10 can be simply and manually carried out only by fitting or engaging predetermined shapes of barrel components without using an adhesive or screws or without using special assembly tools.

Figure 10:
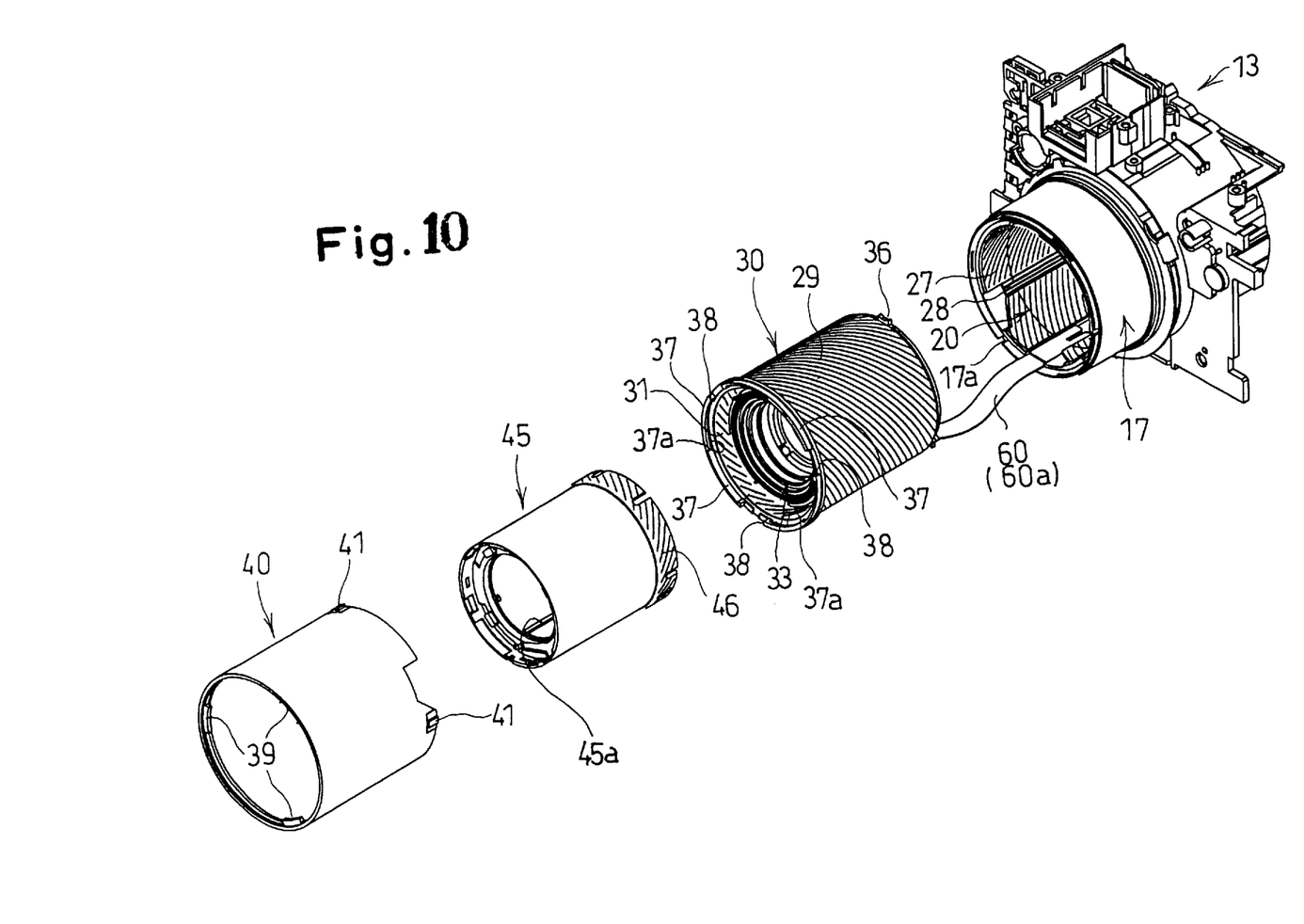
FIG. 10 is an exploded perspective view of a main part of a zoom lens barrel in which a second outer barrel is removed from a complete zoom lens barrel.

The zoom lens barrel 10 can be disassembled in the order of operations opposite to that for the assembly mentioned above. Namely, the decoration rings 42 and 44 are removed first. As mentioned above, the decoration ring 42 can be detached by deforming the same by a predetermined amount of deformation so as to disengage the engagement projections 43 from the slip-off prevention recesses 37a. After the removal of the decoration ring 42, the engagement projections 39 of the second outer barrel 40 can be disengaged from the recesses 38 of the drive cam ring 30. Namely, the second outer barrel 40 can be moved forward in the optical axis direction to remove the same. As shown in FIG. 10, when the second outer barrel 40 is removed, the helicoid engagements (between the third outer barrel 45 and the drive cam ring 30 and between the drive cam ring 30 and the first linear movement guide ring 20) can be disengaged by relatively rotating them in the advance direction beyond the most advanced position. Since the drive cam ring 30 and the second linear movement guide ring 33 are disengageably engaged through the engagement projections and grooves at a specific angular position, the drive cam 30 can be disengaged from the second linear movement guide ring 33. Since the FPC board 60 is connected to the camera body 9, the first outer barrel 17 and the first linear movement guide ring 20 are not detached from the stationary barrel 13 in FIG. 10, the first outer barrel 17 and the first linear movement guide ring 20 can be disassembled by disengaging the engagement projections and grooves thereof at a specific angular position as mentioned above.

Figure 1:
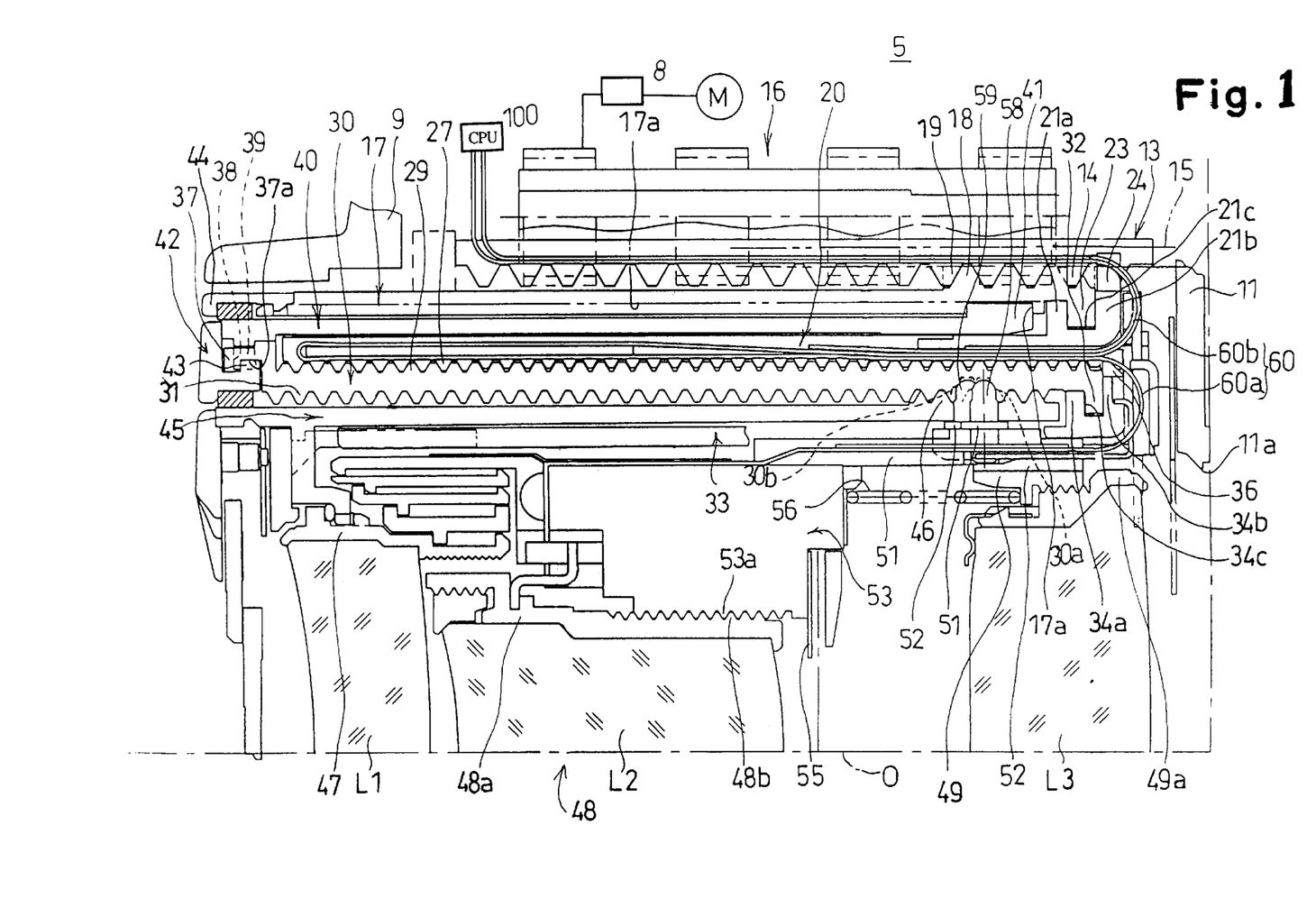
FIG. 1 is a longitudinal sectional view of a zoom lens barrel in a retracted position.
Figure 2:
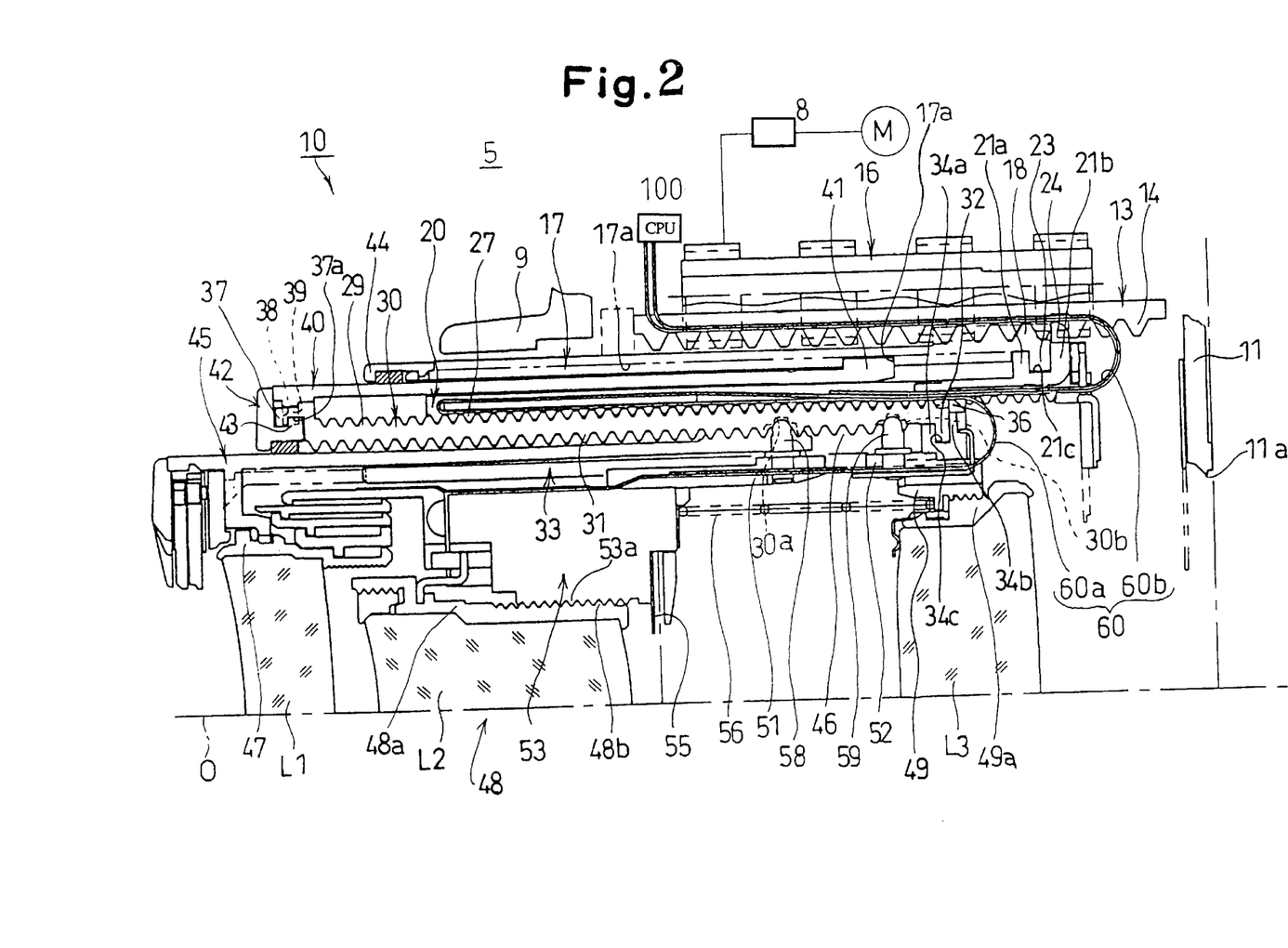
FIG. 2 is a longitudinal sectional view of a zoom lens barrel shown in FIG. 1, at a wide angle extremity.
Figure 3:
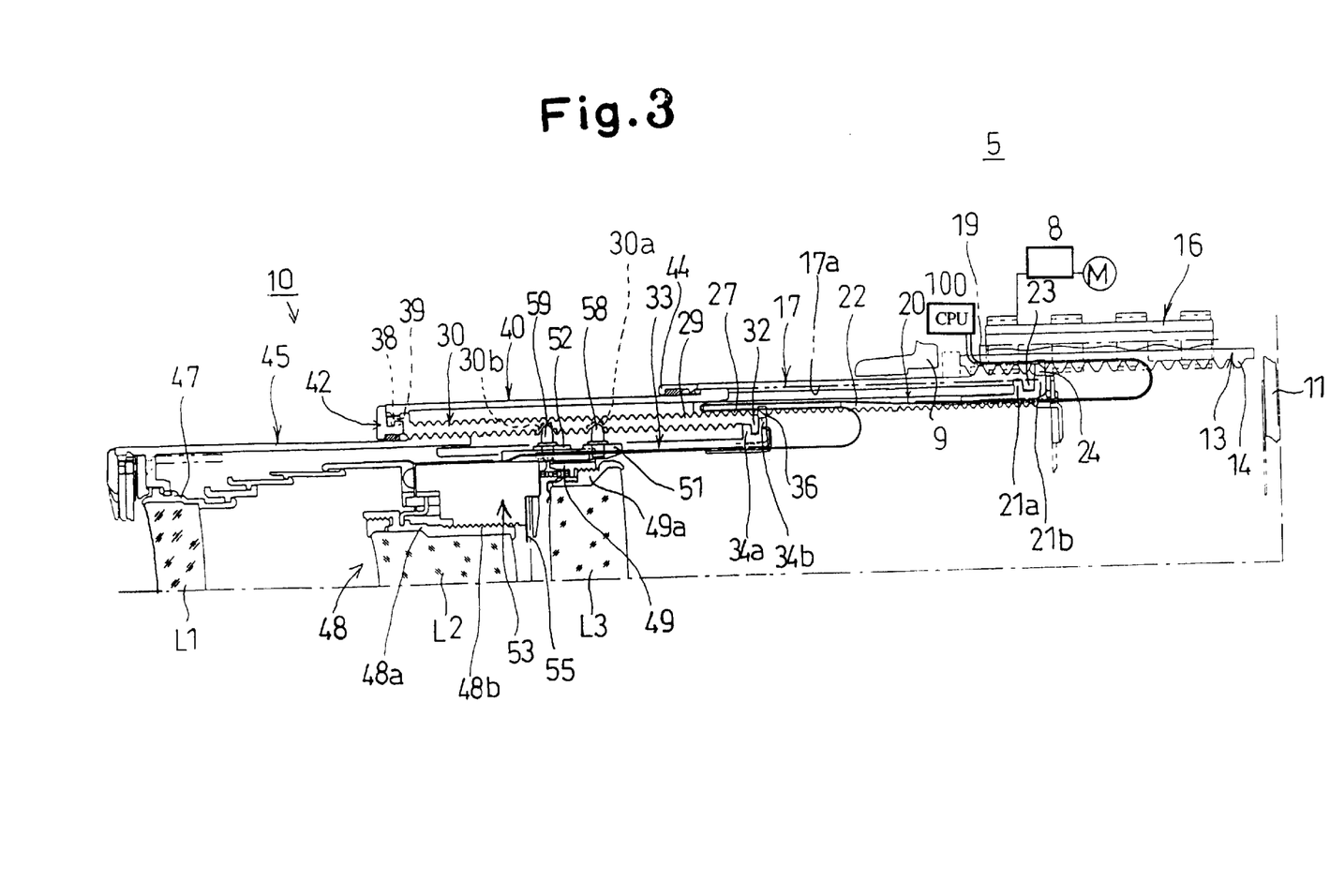
FIG. 3 is a longitudinal sectional view of a zoom lens barrel shown in FIG. 1, at a telephoto extremity.

As can be seen in FIG. 1, when the zoom lens barrel 10 is in the retracted position in which the zoom lens barrel is retracted in the camera body 9, the decoration rings 42 and 44 are not exposed to the outside at the outer peripheries thereof. Therefore, it is impossible to exert an external deformation force on the decoration ring 42 or 44, and hence the decoration ring 42 or 44 cannot be detached. To disassemble the zoom lens barrel 10, the zoom lens barrel is slightly extended from the retracted position, so that the outer periphery of the decoration ring 42 or 44 is exposed to the outside. With this arrangement, no accidental disengagement of the barrel elements occurs in the retracted position.

Thus, the barrel components of the zoom lens barrel 10 are engaged through the annular grooves and projections at the portions in which a relative rotation takes place therebetween without causing a relative axial movement in the optical axis direction and are guided through the linear movement guide grooves and projections at the portions in which a relative axial movement takes place therebetween without causing a relative rotation. This facilitates the engagement or disengagement of the barrel components.

Although the drive cam ring 30 and the second outer barrel 40 are connected so as not to relatively move in the optical axis direction or relatively rotate, the connection is located at the front ends thereof, and hence the insertion or removal thereof can be easily carried out in the optical axis direction. Consequently, when the slip-off preventing decoration ring 42 is removed, the second outer barrel 40 can be moved and detached in the axial direction. Since the decoration rings 42 and 44 are attached by slightly deforming the same, they can be manually and easily detached.

Since the second outer barrel 40 is attached to complete the rotation transmission mechanism which transmits the rotation of the zoom motor at the last stage of the assembly, the zoom lens barrel can be easily disassembled even after the camera assembly is completed by detaching the second outer barrel 40. Moreover, in the zoom lens barrel 10, the relative positional relationship between the lens groups is maintained during the detachment of the barrel components, and hence no focus re-adjustment is necessary for each disassembly and re-assembly.

Since the feed mechanism of the zoom lens barrel 10 is formed only by the elements with helicoids, including the drive cam ring 30 which is provided on its inner and outer peripheral surfaces with helicoids, the rigidity of the zoom lens barrel assembly according to the present invention is higher than that of a known zoom lens barrel which is provided with a rotation feed guide portion using a cam mechanism.

Note that the present invention is not limited to the illustrated embodiments. For instance, the relationship between the rotation transmission grooves 17a and the rotation transmission projections 41, to be provided on the first outer barrel 17 and the second outer barrel 40 can be the opposite of the arrangement illustrated in the drawings. Namely, the rotation transmission grooves 17a and the rotation transmission projections 41 can be provided on the second outer barrel 40 and the first outer barrel 17, respectively. Likewise, the relationship between the engagement recesses 38 and the engagement projections 39, to be provided on the drive cam ring 30 and the second outer barrel 40, can be the opposite of the arrangement illustrated in the drawings. Namely, the engagement recesses 38 and the engagement projections 39 can be provided on the second outer barrel 40 and the drive cam ring 30, respectively.

As may be understood from the above discussion, according to the present invention, the rotation transmission mechanism which transmits the rotation of the first rotational feed barrel to the second rotational feed barrel is removably inserted from the front between the first and second rotational feed barrels, and the decoration ring which secures the connection between the rotation transmission barrel and the second rotational feed barrel is detachably attached by a predetermined amount of deformation of the decoration ring. Consequently, a multi-stage extension type zoom lens which can be easily assembled or disassembled can be provided. Furthermore, due to the construction of the zoom lens barrel according to the present invention, the assembly or disassembly of the zoom lens barrel can be carried out without having to tamper with the lens groups or the shutter unit, and without having to disassemble any components on the camera body. Moreover, since the feed mechanism of each feed-stage unit is comprised of the helicoid members, the rigidity of the multi-stage extension type zoom lens barrel assembly of the present invention can be increased.

What is claimed is:

1. A multi-stage extension type zoom lens barrel, comprising:

a first rotational feed barrel which is rotatably connected to a stationary barrel integral with a camera body, so that when the rotation of said first rotational feed barrel occurs, said first rotational feed barrel is moved in an optical axis direction;

a first linear movement barrel which is guided in said first rotational feed barrel to linearly move in the optical axis direction, said first linear movement barrel being connected to said first rotational feed barrel so as to relatively rotate without relatively moving in the optical axis direction;

a second rotational feed barrel which is disposed in, and rotatably connected to, said first linear movement barrel, so that when said second rotational feed barrel is rotated, said second rotational feed barrel is moved in the optical axis direction relative to said first linear movement barrel;

a rotation transmission barrel which is removably inserted between said first rotational feed barrel and said first linear movement barrel from the front thereof;

a rotation transmission groove and a projection which are provided on one and the other of said rotation transmission barrel and said first rotational feed barrel, said rotation transmission groove extending in a direction parallel with the optical axis; wherein said rotation transmission projection is engaged in said rotation transmission groove to connect said rotation transmission barrel and said first rotational feed barrel so as to relatively move in the optical axis direction without relatively rotating;

a connection mechanism provided at the front ends of said rotation transmission barrel and said second rotational feed barrel, for connecting said rotation transmission barrel and said second rotational feed barrel when said rotation transmission barrel is inserted during assembly; and a connection holding decoration ring which is detachably attached to the front ends of said second rotational feed barrel and said rotation transmission barrel due to a predetermined amount of deformation of said decoration ring, so that when said decoration ring is attached, said decoration ring secures the connection between said second rotational feed barrel and said rotation transmission barrel.

2. A multi-stage extension type zoom lens barrel according to claim 1, wherein said connection mechanism comprises a plurality of radially projecting engagement projections and a plurality of engagement recesses in which said engagement projections are fitted in said engagement recesses in the axial direction, said engagement projections and said engagement recesses being provided on one and the other of said second rotational feed barrel and said rotation transmission barrel, respectively.

3. A multi-stage extension type zoom lens barrel according to claim 1, further comprising another deformable decoration ring separate from said connection holding decoration ring, which is detachably attached to the front end of said first rotational feed barrel due to a predetermined amount of deformation of said second decoration ring, so that when said second decoration ring is attached, said rotation transmission barrel can be prevented from slipping off from said first rotational feed barrel in the optical axis direction.

4. A multi-stage extension type zoom lens barrel according to claim 3, wherein said decoration rings cannot be detached externally when said zoom lens barrel is retracted inside said camera body.

5. A multi-stage extension type zoom lens barrel, according to claim 1, wherein
   said first rotational feed barrel is connected to said stationary barrel via helicoids;
   said first linear movement barrel is provided on its inner peripheral surface with a female helicoid;
   said second rotational feed barrel is in the form of a double helicoid barrel which is provided with a male helicoid which engages with said female helicoid of said first linear movement barrel on the outer peripheral surface thereof, and provided with a female helicoid on the inner peripheral surface thereof;
   and wherein said zoom lens barrel comprises
      a second linear movement barrel which is provided with a male helicoid which engages with said female helicoid of said second rotational feed barrel and which is guided to linearly move in the optical axis direction;
      a first lens group which is supported by said second linear movement barrel; and
      at least one lens group which is guided relative to said second linear movement barrel to linearly move independently of said first lens group.

6. A multi-stage extension type zoom lens barrel, comprising:
   a stationary barrel which is integral with a camera body;
   a first feed-stage unit comprising: a first rotational feed barrel which is rotatably connected to said stationary barrel and is moved in an optical axis direction upon rotation thereof, and a first linear movement barrel which is guided in said first rotational feed barrel to linearly move in the optical axis direction and is connected to said first rotational feed barrel so as to relatively rotate without relatively moving in the optical axis direction;
   a second feed-stage unit comprising: a second rotational feed barrel which is disposed in, and rotatably connected to, said first linear movement barrel, wherein said second rotational feed barrel is moved in the optical axis direction relative to said first linear movement barrel when said second rotational feed barrel is rotated; and
   a rotational transmission barrel which is removably inserted between said first rotational feed barrel and said first linear movement barrel from the front thereof, said rotational transmission barrel being engaged with said first rotational feed barrel so as to relatively move in the direction of the optical axis and to rotate together therewith, and wherein said rotation transmission barrel is integrally connected to said second rotational feed barrel.

7. A multi-stage extension type zoom lens barrel according to claim 6, wherein the assembly of said zoom lens barrel comprises:
   attaching said first and second feed-stage units to said stationary barrel from the front thereof; and
   inserting said rotation transmission barrel between said first rotational feed barrel and said first linear movement barrel from the front thereof, in that order; wherein the rotation of said first rotational feed barrel of said first feed-stage unit can be transmitted to said second rotational feed barrel of said second feed-stage unit.

8. A multi-stage extension type zoom lens barrel according to claim 7, further comprising:
   a first decoration ring which is detachably attached to the front ends of said second rotational feed barrel and said rotation transmission barrel via a predetermined amount of deformation of said first decoration ring;
   a second decoration ring which is detachably attached to the front end of said first rotational feed barrel via a predetermined amount of deformation of said second decoration ring.

9. A multi-stage extension type zoom lens barrel according to claim 8, wherein upon said assembly of said rotation transmission barrel being completed, said first decoration ring is attached to the front ends of said second rotational feed barrel and said rotation transmission barrel so as to secure the connection therebetween; and
   said second decoration ring is attached to the front end of said first rotational feed barrel so as to prevent said rotation transmission barrel from slipping off said first rotational feed barrel in the optical axis direction.

10. A multi-stage extension type zoom lens barrel according to claim 6, wherein the disassembly of said zoom lens barrel comprises:
   removing said rotation transmission barrel, between said first rotational feed barrel and said first linear movement barrel, in a forward direction away from said stationary barrel; wherein the rotation transmission from said first rotational feed barrel of said first feed-stage unit to said second rotational feed barrel of said second feed-stage unit is disengaged; and
   said first and second feed-stage units are disengaged and removed in the forward direction, away from said stationary barrel.

11. A multi-stage extension type zoom lens barrel according to claim 10, further comprising:
   a first decoration ring which is detachably attached to the front ends of said second rotational feed barrel and said rotation transmission barrel via a predetermined amount of deformation of said first decoration ring;
   a second decoration ring which is detachably attached to the front end of said first rotational feed barrel via a predetermined amount of deformation of said second decoration ring.

12. A multi-stage extension type zoom lens barrel according to claim 11, wherein before said disassembly of said rotation transmission barrel is carried out, said first decoration ring is detached from the front ends of said second rotational feed barrel and said rotation transmission barrel; wherein said rotation transmission barrel can be removed in the forward direction away from said second rotational feed barrel; and
   said second decoration ring is detached from the front end of said first rotational feed barrel wherein said rotation transmission barrel can be removed in the forward direction away from said first rotational feed barrel.

* * * * *